(12) United States Patent
Okuhara et al.

(10) Patent No.: US 6,469,079 B1
(45) Date of Patent: Oct. 22, 2002

(54) CHLORINATED VINYL CHLORIDE RESIN COMPOSITION

(75) Inventors: Toshio Okuhara, Hyogo (JP); Tadashi Tadokoro, Hyogo (JP); Hiroaki Shiota, Hyogo (JP); Takeyuki Suzuki, Hyogo (JP); Minoru Isshiki, Shiga (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/437,831

(22) Filed: Nov. 10, 1999

(30) Foreign Application Priority Data

Nov. 11, 1998 (JP) .......................................... 10-320816
Nov. 11, 1998 (JP) .......................................... 10-320817

(51) Int. Cl.$^7$ ................................................. C08K 5/57
(52) U.S. Cl. ...................... 524/178; 524/487; 524/519; 524/523; 524/527
(58) Field of Search .................................. 524/450, 178, 524/487, 519, 523, 527

(56) References Cited

U.S. PATENT DOCUMENTS

| | | | | |
|---|---|---|---|---|
| 4,871,498 A | * | 10/1989 | Nakamura et al. | .......... 264/115 |
| 5,141,980 A | * | 8/1992 | Ranceze et al. | ............. 524/399 |
| 5,359,011 A | | 10/1994 | Vielhaber et al. | |
| 5,997,836 A | * | 12/1999 | Sato et al. | ............... 423/420.2 |

FOREIGN PATENT DOCUMENTS

| | | |
|---|---|---|
| EP | 0 658 594 A1 | 6/1995 |
| JP | 49 037943 A | 4/1974 |
| JP | 53-18227 | 6/1978 |
| JP | 60-45658 | 10/1985 |
| JP | 63 083155 | 4/1988 |
| JP | 2-1855 | 1/1990 |
| JP | 09 124867 A | 5/1997 |
| JP | 09 174645 A | 7/1997 |

* cited by examiner

Primary Examiner—Peter D. Mulcahy
(74) Attorney, Agent, or Firm—Armstrong, Westerman & Hattori, LLP

(57) ABSTRACT

A chlorinated vinyl chloride resin composition comprising 100 parts by weight of chlorinated vinyl chloride resin and a hydroxypolycarboxylic acid salt, e.g., sodium tartrate, and/or 0.2 to 1.5 parts by weight of zeolite. The composition exhibits improved thermal stability and is particularly suited to pipe extrusion.

7 Claims, No Drawings

CHLORINATED VINYL CHLORIDE RESIN COMPOSITION

FIELD OF THE INVENTION

This invention relates to a chlorinated vinyl chloride resin composition and pipes obtained by extruding the resin composition. More particularly, it relates to a chlorinated vinyl chloride resin composition having excellent thermal stability in molding and to extruded pipes obtained therefrom.

BACKGROUND OF THE INVENTION

Chlorinated vinyl chloride resin moldings are characterized by their high heat resistance and have been applied to use in relatively high temperatures in which conventional vinyl chloride resin moldings undergo heat deformation and do not stand use. For example, having a heat distortion temperature 20 to 40° C. higher than that of vinyl chloride resin moldings, chlorinated vinyl chloride resin molded pipes can be used as pipes for hot water. Additionally, chlorinated vinyl chloride resins can be molded into pipes by means of general-purpose extrusion equipment used for polyvinyl chloride. This is one of the factors broadening the utility of chlorinated vinyl chloride resins. The higher heat distortion temperature of chlorinated vinyl chloride resin moldings is also taken advantage of for use as sheeting for appliances that may be exposed to heat.

However, chlorinated vinyl chloride resins are inferior to vinyl chloride resins in thermal stability and are liable to scorch during molding. For example, they tend to undergo yellowing or in some cases develop burn marks during extrusion into pipes for hot water, only to produce products having no commercial value. Or, they tend to undergo yellowing or in some cases develop burn marks during calendering in obtaining heat-resistant sheeting, only to produce sheeting having no commercial value.

SUMMARY OF THE INVENTION

An object of the invention is to provide a chlorinated vinyl chloride resin composition having excellent thermal stability and extruded pipes thereof.

The above object is accomplished by a chlorinated vinyl chloride resin composition comprising 100 parts by weight of a chlorinated vinyl chloride resin and 0.2 to 1.5 parts by weight of zeolite, a chlorinated vinyl chloride resin composition containing a hydroxypolycarboxylic acid salt, or a chlorinated vinyl chloride resin composition comprising 100 parts by weight of a chlorinated vinyl chloride resin containing a hydroxypolycarboxylic acid salt and 0.2 to 1.5 parts by weight of zeolite.

The chlorinated vinyl chloride resin composition containing a hydroxypolycarboxylic acid salt and/or zeolite exhibits appreciably improved thermal stability. The chlorinated vinyl chloride resin composition containing both a hydroxypolycarboxylic acid salt and zeolite exhibits outstandingly improved thermal stability. The compositions of the invention are extremely advantageous for producing piping or sheeting.

DETAILED DESCRIPTION OF THE INVENTION

The vinyl chloride resin, which can be used as a starting material for the chlorinated vinyl chloride resin in the invention, includes homopolymers of vinyl chloride and copolymers of vinyl chloride and copolymerizable monomers, such as ethylene, propylene, vinyl acetate, allyl chloride, allyl glycidyl ether acrylic esters, and vinyl ethers.

The vinyl chloride resin preferably has an average degree of polymerization of 600 to 1500, still preferably 600 to 1300, particularly preferably 600 to 1200. Resin compositions prepared from vinyl chloride resins whose average degree of polymerization is less than 600 tend to have insufficient mechanical strength, and those prepared from vinyl chloride resins having an average degree of polymerization exceeding 1500 tend to be difficult to process.

The degree of the chlorinated vinyl chloride resin is preferably 62 to 70% by weight, still preferably 63 to 70% by weight, particularly preferably 64 to 70% by weight. Chlorinated vinyl chloride resins having a degree of chlorination of less than 62% by weight tend to fail to provide resin compositions with sufficient heat resistance, and those having a degree of chlorination exceeding 70% by weight have an increased melt viscosity so that the resulting resin compositions meet processing difficulties.

The resin composition according to the first aspect of the invention is characterized by comprising 0.2 to 1.5 parts by weight of zeolite per 100 parts by weight of a chlorinated vinyl chloride resin. Zeolite may be either naturally-occurring zeolite or synthetic one. In particular, calcium-substituted A type zeolite having a residual sodium content of not more than 10% by weight in terms of $Na_2O$ and a degree of calcium substitution of 42% or more is preferred; for it hardly develop foams during molding. CS-100, an additive for plastics available from Kousei K.K., is known as calcium-substituted A type zeolite having the above-described composition.

Zeolite is added in an amount of 0.2 to 1.5 parts by weight per 100 parts by weight of a chlorinated vinyl chloride resin. Addition of less than 0.2 part by weight of zeolite is practically ineffective in improving thermal stability. Because the effect of zeolite addition is saturated at 1.5 parts by weight, addition of more than this amount not only brings about no further improvement but causes foaming in molding.

The chlorinated vinyl chloride resin composition according to the second aspect of the invention is characterized in that the chlorinated vinyl chloride resin contains a hydroxypolycarboxylic acid salt. Addition of a hydroxypolycarboxylic acid salt brings about marked improvement in thermal stability. The hydroxypolycarboxylic acid salt which can be used in the invention includes salts formed of at least one carboxyl groups of hydroxypolycarboxylic acids, such as tartaric acid, malic acid, tartronic acid, α-methylmalic acid, tetrahydrosuccinic acid, citric acid, and 1,2-dihydroxy-1,1, 2-ethanetricarboxylic acid, with sodium, potassium, etc. The salt may have a free carboxyl group, and may have both sodium and potassium per molecule. Of these salts, sodium tartrate, potassium tartrate, sodium malate, and potassium malate are particularly effective in improving thermal stability.

The hydroxypolycarboxylic acid salt is suitably added to the chlorinated vinyl chloride resin in a concentration of 50 to 5000 ppm. In concentrations less than 50 ppm the effect on thermal stability may be insufficient. In concentrations exceeding 5000 ppm the transparency of the composition tends to be reduced, which is problematical for use as sheeting.

The chlorinated vinyl chloride resin composition according to the third aspect of the invention is characterized by comprising (a) the chlorinated vinyl chloride resin composition containing a hydroxypolycarboxylic acid salt according to the second aspect of the invention and (b) zeolite as used in the first aspect of the invention. The combination of the hydroxypolycarboxylic acid salt and zeolite achieves outstanding improvement on thermal stability in pipe extrusion.

The present invention is particularly effective when applied to chlorinated vinyl chloride resin compositions containing an impact modifier, an organotin heat stabilizer, and a lubricant as are commonly employed in the art. The combined use of these additives brings about enhanced usefulness of the composition in molding into piping or sheeting.

Useful impact modifiers include those generally used in chlorinated vinyl chloride resins, such as a methyl methacrylate-butadiene-styrene polymer (MBS), an acrylonitrile-butadiene-styrene polymer (ABS), butadiene or styrene-butadiene rubber to which methyl methacrylate-styrene-acrylonitrile is grafted (MABS), chlorinated polyethylene (CPE), and impact modifiers mainly comprising acrylic rubber.

In order to balance impact resistance with heat resistance, it is preferred to use the impact modifiers in a total amount of 3 to 14 parts by weight per 100 parts by weight of the chlorinated vinyl chloride resin. For the same purpose, it is preferred to use MBS and CPE jointly.

While MBS as an impact modifier is not particularly limited, MBS having a butadiene content less than 60% by weight is preferred. MBS having a butadiene content of less than 60% by weight reduces the die pressure and extrusion torque in pipe extrusion to permit an increase in feed, which will lead to improved productivity.

Where MBS and CPE are used jointly as an impact modifier, MBS is preferably used in an amount of 3 to 14 parts by weight per 100 parts by weight of the chlorinated vinyl chloride resin. The improvement in impact resistance achieved by less than 3 parts of MBS is insubstantial. If added in amounts exceeding 14 parts, MBS impairs the heat resistance characteristic of a chlorinated vinyl chloride resin. From the standpoint of impact resistance/heat resistance balance of extruded pipes, a still preferred amount of MBS to be added is 4 to 12 parts by weight. It is preferred for CPE as an impact modifier to have a chlorine content of 10 to 50% by weight. CPE is preferably used in an amount of 1 to 5 parts by weight per 100 parts by weight of the chlorinated vinyl chloride resin. However, it is preferred that the total amount of MBS and CPE is within the range of from 3 to 14 parts by weight per 100 parts by weight of a chlorinated vinyl chloride resin. Similarly to MBS, CPE is effective in reducing the die pressure and extrusion torque in pipe extrusion, which allows the feed to be increased, resulting in an increased throughput. CPE having a chlorine content of 30 to 40% by weight is particularly preferred for its compatibility with the base resin, i.e., a chlorinated vinyl chloride resin, which can further improve the impact resistance of extruded pipes.

In addition to the above-mentioned impact modifier, the chlorinated vinyl chloride resin composition of the invention can further be combined with an organotin heat stabilizer and a lubricant for improving the thermal stability in molding as previously stated.

Useful organotin stabilizers include alkyltin compounds, such as dimethyltin, dibutyltin, dioctyltin, a mixed metal alkyltin, a dialkyltin dicarboxylic acid salt, a methylmercaptotin, octylmercaptotin, butylmercaptotin, a dialkyltin bis(alkylmercaptocarboxylate), di-n-octyltin-S,S'-bis(iso-octylmercaptoacetate), a dibutyltin maleate polymer, dibutyltin maleate, a dioctyltin maleate polymer, and dioctyltin maleate. The amount of the organotin stabilizer to be added is preferably 1 to 5 parts by weight per 100 parts by weight of the chlorinated vinyl chloride resin. Addition of less than 1 part of the organotin stabilizer results in insubstantial effect on thermal stability. Because the effect reaches the maximum at 5 parts, addition of more than 5 parts brings about no further improvement.

Useful lubricants include poly(glycerol di- or trioleate), polyethylene, polyethylene oxide, and high-molecular weight paraffin wax. Polyethylene wax or polyethylene oxide wax is preferred. The amount of the lubricant to be added is preferably 1.5 to 4 parts by weight per 100 parts by weight of the chlorinated vinyl chloride resin. Less than 1.5 parts of the lubricant is practically ineffective in reducing melt viscosity and improving extrudability of the resin composition. Addition of more than 4 parts of the lubricant results in excessive lubrication between the resin composition and metal, tending to cause surging during extrusion.

The thermal stability improving effect of organotin heat stabilizers is saturated at a certain amount, and a further increased amount of the stabilizer gives no further improvement on thermal stability. Based on this fact, the fundamental concept of the present invention consists in finding that a hydroxypolycarboxylic acid salt or zeolite exerts additive effect in improving thermal stability in addition to the effect of an organotin stabilizer and that summation of the effect is obtained when these compounds are used jointly.

If desired, the chlorinated vinyl chloride resin composition of the invention can comprise a vinyl chloride resin in addition to the aforesaid essential and optional components. The composition can further comprise fillers, such as titanium dioxide and calcium carbonate, and colorants commonly used in chlorinated vinyl chloride resins.

The chlorinated vinyl chloride resin composition of the invention is prepared by compounding the aforesaid essential components and desired additives by means of conventional mixing and kneading apparatus.

The composition according to the invention is useful in any field where conventional chlorinated vinyl chloride resins have been used. It is particularly suited to the manufacture of extruded pipes because of the above-described characteristics. The present invention is especially effective in improving long-term thermal stability in pipe extrusion of a chlorinated vinyl chloride resin composition. For example, where a pipe extruder die has scratches in the inside thereof, the extruded pipes suffer from no burn marks even after 3 hours' extrusion.

The present invention will now be illustrated in greater detail with reference to Examples in view of Comparative Examples, but it should be understood that the invention is not deemed to be limited thereto. Unless otherwise noted, all the parts and percents are by weight.

EXAMPLE 1

A vinyl chloride resin having a degree of polymerization of 1000 was post-chlorinated to obtain a chlorinated vinyl chloride resin having a degree of chlorination of 67%. To the chlorinated resin was added 3000 ppm of sodium tartrate. A hundred parts of the sodium tartrate-added chlorinated vinyl chloride resin were compounded with 6 parts of an impact modifier B22 (MBS, produced by Kanegafuchi Kagaku Kogyo K.K.), 3 parts of an impact modifier H135 (CPE having a chlorine content of 35%, produced by Daiso Co., Ltd.), 2 parts of mercaptobutyltin (heat stabilizer), 2 parts of polyethylene wax (lubricant), and 5 parts of titanium dioxide (filler). The mixture was blended in a homogenizer at 10,000 rpm for 4 minutes to obtain a uniform compound.

Thermal stability of the compound was tested in Labo-Plastomill (manufactured by Toyo Seiki K.K.) under conditions of 190° C., a fill (loading weight) of 65 g, and a rotational speed of 50 rpm. The time when the torque having reached a steady state (4.5 kg·m) began to rise, taken as a decomposition initiation time, was 28 minutes.

EXAMPLE 2

A uniform compound of a chlorinated vinyl chloride resin composition was prepared in the same manner as in Example 1, except for replacing sodium tartrate with sodium malate.

Thermal stability of the compound was tested in the same manner as in Example 1. The decomposition initiation time was 28 minutes. The stationary torque was 4.5 kg·m.

Comparative Example 1

A uniform compound of a chlorinated vinyl chloride resin composition was prepared in the same manner as in Example 1, except that sodium tartrate was not added to the chlorinated vinyl chloride resin.

Thermal stability of the compound was tested in the same manner as in Example 1. The decomposition initiation time was 7 minutes. The stationary torque was 4.5 kg·m.

The results of Examples 1 and 2 and Comparative Example 1 are shown in Table 1 below.

TABLE 1

|  | Example 1 | Example 2 | Compara. Example 1 |
| --- | --- | --- | --- |
| Sodium tartrate | 3000 ppm | — | — |
| Sodium malate | — | 3000 ppm | — |
| Decomposition initiation time | 28 mins | 28 mins | 7 mins |
| Stationary torque | 4.5 kg · m | 4.5 kg · m | 4.5 kg · m |

EXAMPLE 3

A vinyl chloride resin having a degree of polymerization of 600 was post-chlorinated to obtain a chlorinated vinyl chloride resin having a degree of chlorination of 64%. To the chlorinated resin was added 500 ppm of sodium tartrate. A hundred parts of the sodium tartrate-added chlorinated vinyl chloride resin were compounded with 10 parts of an impact modifier B12 (MBS, produced by Kanegafuchi Kagaku Kogyo K.K.), 2 parts of octylmercaptotin (stabilizer), and 2 parts of polyethylene wax (lubricant). The mixture was blended by hand to obtain a uniform compound.

The compound was kneaded in an 8-in. roll mill at 190° C. for 3 minutes and rolled to obtain a sheet of 40 mm by 50 mm. When the rolled sheet was hung in an oven set at 195° C., blackening was observed in 150 minutes. When two thicknesses of the rolled sheet were pressed at 195° C. for 10 minuets, the pressed plate had excellent transparency as observed with the naked eye.

Comparative Example 2

A uniform compound of a chlorinated vinyl chloride resin composition was prepared in the same manner as in Example 3, except that sodium tartrate was not added to the chlorinated vinyl chloride resin. The thermal stability of the compound was tested in the same manner as in Example 3. As a result, the rolled sheet blackened in 120 minutes, and the pressed plate had poor transparency, suffering from slight yellowing, as observed with the naked eye.

The results of Example 3 and Comparative Example 2 are shown in Table 2.

TABLE 2

|  | Example 3 | Compara. Example 2 |
| --- | --- | --- |
| Sodium tartrate | 500 ppm | — |
| Blackening time | 150 mins. | 120 mins. |
| Transparency | excellent | poor (yellowing) |

EXAMPLE 4

A vinyl chloride resin having a degree of polymerization of 1000 was post-chlorinated to obtain a chlorinated vinyl chloride resin having a degree of chlorination of 67%. To the chlorinated resin was added 500 ppm of sodium tartrate. A hundred parts of the sodium tartrate-added chlorinated vinyl chloride resin were compounded with 6 parts of an impact modifier B22 (MBS, produced by Kanegafuchi Kagaku Kogyo K.K.), 3 parts of an impact modifier H135 (CPE having a chlorine content of 35%, produced by Daiso Co., Ltd.), 2 parts of butylmercaptotin (stabilizer), 2 parts of polyethylene wax (lubricant), 5 parts of titanium dioxide (filler) and a pigment. The mixture was blended in a 300 l-volume Henschel mixer to obtain a uniform compound weighing about 100 kg.

The resulting compound was extruded at a resin temperature of about 200° C. by means of a conical extruder (Toshiba Corp.) to obtain ¾-in. pipes. The pipe extrusion was continued for 1 hour at a throughput of 55 kg/hr to obtain pipes having satisfactory surface appearance with no burn marks. In a hydrostatic stress test (82° C., 521 psi as specified in ASTM D2846, Table 5), the resulting pipes did not burst for 20 minutes or longer, exhibiting satisfactory physical properties.

Comparative Example 3

A uniform compound of a chlorinated vinyl chloride resin composition was prepared in the same manner as in Example 4, except that sodium tartrate was not added to the chlorinated vinyl chloride resin, and the resulting compound was extruded into pipes in the same manner as in Example 4. As a result, burn marks developed on the extruded pipes in about 1 hour from the start of extrusion. When tested in the same manner as in Example 4, the pipes did not burst for 20 minutes or longer, exhibiting satisfactory physical properties.

The results of Example 4 and Comparative Example 3 are summarized in Table 3 below.

TABLE 3

|  | Example 4 | Compara. Example 3 |
| --- | --- | --- |
| Sodium tartrate | 500 ppm | — |
| Surface appearance of pipes | satisfactory | burn marks |

TABLE 3-continued

| | Example 4 | Compara. Example 3 |
|---|---|---|
| Bursting time of pipes in hydrostatic stress test | >20 mins. | >20 mins. |

EXAMPLE 5

A vinyl chloride resin having a degree of polymerization of 1000 was post-chlorinated to obtain a chlorinated vinyl chloride resin having a degree of chlorination of 67%. A hundred parts of the chlorinated vinyl chloride resin were compounded with 6 parts of an impact modifier B22 (MBS having a butadiene content of 46%, produced by Kanegafuchi Kagaku Kogyo K.K.), 3 parts of an impact modifier H135 (CPE having a chlorine content of 35%, produced by Daiso Co., Ltd.), 2 parts of octylmercaptotin (stabilizer), 1 part of synthetic zeolite CS-100 (produced by Kousei K.K.), 2 parts of polyethylene wax (lubricant), and 5 parts of titanium dioxide (filler). The mixture was blended in a homogenizer at 10,000 rpm for 4 minutes to obtain a uniform compound.

Thermal stability of the compound was tested in Labo-Plastomill (Toyo Seiki) under the same conditions as in Example 1. The decomposition initiation time was 15 minutes. The resin temperature was 200° C., and the stationary torque was 4.5 kg·m.

EXAMPLE 6

A vinyl chloride resin having a degree of polymerization of 1000 was post-chlorinated to obtain a chlorinated vinyl chloride resin having a degree of chlorination of 67%. To the chlorinated resin was added 3000 ppm of sodium tartrate. A hundred parts of the sodium tartrate-added chlorinated vinyl chloride resin were compounded with 6 parts of an impact modifier B22 (MBS having a butadiene content of 46%, produced by Kanegafuchi Kagaku Kogyo K.K.), 3 parts of an impact modifier H135 (CPE having a chlorine content of 35%, produced by Daiso Co., Ltd.), 2 parts of octylmercaptotin (stabilizer), 1 part of synthetic zeolite CS-100 (produced by Kousei K.K.), 2 parts of polyethylene wax (lubricant), and 5 parts of titanium dioxide (filler). The mixture was blended in a homogenizer at 10,000 rpm for 4 minutes to obtain a uniform compound.

Thermal stability of the compound was tested in the same manner as in Example 5. As a result, the decomposition initiation time was 36 minutes. The resin temperature was 200° C., and the stationary torque was 4.5 kg·m.

Comparative Example 4

A uniform compound was prepared in the same manner as in Example 5, except that the zeolite CS-100 was not added. As a result of the same thermal stability test, the decomposition initiation time was 7 minutes. The resin temperature was 200° C., and the stationary torque was 4.5 kg·m.

The results of Examples 5 and 6 and Comparative Example 4 are displayed in Table 4.

TABLE 4

| | Example 5 | Example 6 | Compara. Example 4 |
|---|---|---|---|
| Sodium tartrate | — | 3000 ppm | — |
| Zeolite | 1 part | 1 part | — |
| Decomposition initiation time | 15 mins | 36 mins | 7 mins |
| Resin temperature | 200° C. | 200° C. | 200° C. |
| Stationary torque | 4.5 kg · m | 4.5 kg · m | 4.5 kg · m |

EXAMPLE 7

A vinyl chloride resin having a degree of polymerization of 1000 was post-chlorinated to obtain a chlorinated vinyl chloride resin having a degree of chlorination of 67%. A hundred parts of the chlorinated vinyl chloride resin were compounded with 6 parts of an impact modifier B22 (MBS having a butadiene content of 46%, produced by Kanegafuchi Kagaku Kogyo K.K.), 3 parts of an impact modifier H135 (CPE having a chlorine content of 35%, produced by Daiso Co., Ltd.), 2 parts of octylmercaptotin (stabilizer), 1 part of synthetic zeolite CS-100 (produced by Kousei K.K.), 2 parts of polyethylene wax (lubricant), 5 parts of titanium dioxide (filler), and a pigment. The mixture was blended in a 300 1 Henschel mixer to obtain a uniform compound weighing about 100 kg.

The resulting compound was extruded at a resin temperature of about 200° C. by means of a conical extruder (Toshiba Corp.) to obtain ¾-in. CTS pipes. The pipe extrusion was continued for 1 hour at a throughput of 55 kg/hr to obtain pipes having satisfactory surface appearance with no burn marks. In a hydrostatic stress test (82° C., 521 psi as specified in ASTM D2846, Table 5), the resulting pipes did not burst for 20 minutes or longer, exhibiting satisfactory physical properties.

EXAMPLE 8

A vinyl chloride resin having a degree of polymerization of 1000 was post-chlorinated to obtain a chlorinated vinyl chloride resin having a degree of chlorination of 67%. To the chlorinated resin was added 3000 ppm of sodium tartrate. A hundred parts of the sodium tartrate-added chlorinated vinyl chloride resin were compounded with 6 parts of an impact modifier B22 (MBS having a butadiene content of 46%, produced by Kanegafuchi Kagaku Kogyo K.K.), 3 parts of an impact modifier H135 (CPE having a chlorine content of 35%, produced by Daiso Co., Ltd.), 2 parts of octylmercaptotin (stabilizer), 1 part of synthetic zeolite CS-100 (produced by Kousei K.K.), 2 parts of polyethylene wax (lubricant), 5 parts of titanium dioxide (filler), and a pigment. The mixture was blended in a 300 1 Henschel mixer to obtain a uniform compound weighing about 100 kg.

The resulting compound was extruded into pipes in the same manner as in Example 7. As a result, pipes having satisfactory surface appearance with no burn marks were obtained. When tested in the same manner as in Example 7, the pipes did not burst for 20 minutes or longer, exhibiting satisfactory physical properties.

Comparative Example 5

A uniform compound was prepared in the same manner as in Example 7, except that the synthetic zeolite was not added, and the resulting compound was extruded into pipes in the same manner as in Example 7. As a result, burn marks were observed on the extruded pipes in about 1 hour from the start of extrusion. When tested in the same manner as in Example 7, the pipes did not burst for 20 minutes or longer, exhibiting satisfactory physical properties.

The results obtained in Examples 7 and 8 and Comparative Example 5 are shown in Table 5 below.

TABLE 5

|  | Example 7 | Example 8 | Compara. Example 5 |
|---|---|---|---|
| Sodium tartrate | — | 3000 ppm | — |
| Zeolite | 1 part | 1 part | — |
| Surface appearance of pipes | satisfactory | satisfactory | burn marks |
| Bursting time of pipes in hydrostatic stress test | >20 mins | >20 mins | >20 mins |

EXAMPLE 9

A vinyl chloride resin having a degree of polymerization of 1000 was post-chlorinated to obtain a chlorinated vinyl chloride resin having a degree of chlorination of 67%. To the chlorinated resin was added 3000 ppm of sodium tartrate. A hundred parts of the sodium tartrate-added chlorinated vinyl chloride resin were compounded with 6 parts of an impact modifier B22 (MBS having a butadiene content of 46%, produced by Kanegafuchi Kagaku Kogyo K.K.), 3 parts of an impact modifier H135 (CPE having a chlorine content of 35%, produced by Daiso Co., Ltd.), 2 parts of butylmercaptotin (stabilizer), 1 part of synthetic zeolite CS-100 (produced by Kousei K.K.), 2 parts of polyethylene wax (lubricant), 5 parts of titanium dioxide (filler), and a pigment. The mixture was blended in a 300 l Henschel mixer to obtain a uniform compound weighing about 300 kg.

The resulting compound was extruded into ¾-in. CTS pipes at a controlled resin temperature of about 200° C. by means of a conical extruder (Toshiba Corp.) the die corn of which had three scratches 1 mm deep and 3 cm long made on the outside thereof by scraping the chromium plating. The pipe extrusion was carried out for 3 hours at a throughput of 55 kg/hr to obtain pipes having satisfactory surface appearance with no burn marks. When tested in the same manner as in Example 7, the pipes did not burst for 20 minutes or longer, exhibiting satisfactory physical properties.

As is apparent from the results of Examples 1 to 9, the chlorinated vinyl chloride resin composition containing a hydroxypolycarboxylic acid salt and/or zeolite exhibits appreciably improved thermal stability. When a hydroxypolycarboxylic acid salt and zeolite are used jointly, the improvement in thermal stability in pipe extrusion is outstanding to provide pipes satisfying both surface appearance and physical properties.

While the invention has been described in detail and with reference to specific examples thereof, it will be apparent to one skilled in the art that various changes and modifications can be made therein without departing from the spirit and scope thereof.

What is claimed is:

1. A chlorinated vinyl chloride resin composition comprising 100 parts by weight of a chlorinated vinyl chloride resin, 0.2 to 1.5 parts by weight of zeolite, an impact modifier, 1 to 5 parts by weight of an organotin heat stabilizer, and 1.5 to 4 parts by weight of a lubricant, said vinyl chloride resin before being chlorinated has a degree of polymerization of 600 to 1500, said chlorinated vinyl chloride resin has a degree of chlorination of 62 to 70% by weight, said impact modifier is a combination of 3 to 14 parts by weight of a methyl methacrylate-butadiene-styrene polymer and 1 to 5 parts by weight of chlorinated polyethylene having a chlorine content of 10 to 50% by weight, per 100 parts by weight of a chlorinated vinyl chloride resin, said lubricant is a wax selected from the group consisting of polyethylene wax and polyethylene oxide wax.

2. A chlorinated vinyl chloride resin composition according to claim 1, wherein said zeolite is calcium-substituted A type zeolite having a residual sodium content of 10% by weight or less in terms of $Na_2O$ and a degree of calcium substitution of 42% or more.

3. A chlorinated vinyl chloride resin composition according to claim 1, wherein said methyl methacrylate-butadiene-styrene polymer has a butadiene content of less than 60% by weight.

4. A chlorinated vinyl chloride resin composition according to claim 1, wherein said chlorinated polyethylene has a chlorine content of 30 to 40% by weight.

5. A chlorinated vinyl chloride resin composition according to claim 1, wherein said methyl methacrylate-butadiene-styrene polymer is present in an amount of 4 to 12 parts by weight.

6. A chlorinated vinyl chloride resin composition according to claim 1, which is for pipe extrusion.

7. A chlorinated vinyl chloride resin composition according to claim 1, wherein extruded pipes of said composition suffer from no burn marks even after 3 hours' extrusion when a pipe extruder die has scratches in the inside thereof.

* * * * *